US008422708B2

(12) United States Patent
Elmedyb et al.

(10) Patent No.: US 8,422,708 B2
(45) Date of Patent: Apr. 16, 2013

(54) ADAPTIVE LONG-TERM PREDICTION FILTER FOR ADAPTIVE WHITENING

(75) Inventors: Thomas Bo Elmedyb, Smørum (DK); Jesper Jensen, Smørum (DK)

(73) Assignee: Oticon A/S, Smorum (DK)

(*) Notice: Subject to any disclaimer, the term of this patent is extended or adjusted under 35 U.S.C. 154(b) by 880 days.

(21) Appl. No.: 12/506,983

(22) Filed: Jul. 21, 2009

(65) Prior Publication Data

US 2010/0020979 A1 Jan. 28, 2010

(30) Foreign Application Priority Data

Jul. 24, 2008 (EP) .................................... 08104863

(51) Int. Cl.
*H04R 25/00* (2006.01)
*H04B 15/00* (2006.01)

(52) U.S. Cl.
USPC ........................................... 381/318; 381/93

(58) Field of Classification Search ............... 381/71.11, 381/71.12, 71.14, 93, 312, 317, 318, 320
See application file for complete search history.

(56) References Cited

U.S. PATENT DOCUMENTS 5,479,522 A 12/1995 Lindemann et al.
6,831,986 B2 12/2004 Kates

FOREIGN PATENT DOCUMENTS

EP 0 579 152 A1 1/1994
WO WO-91/13432 A1 9/1991
WO WO-2005/096670 A1 10/2005
WO WO-2007/101477 A1 9/2007
WO WO-2007/113282 A1 10/2007
WO WO-2008/051570 A1 5/2008

OTHER PUBLICATIONS

Sakai,, "Analysis of an adaptive algorithm for feedback cancellation in hearing aids for sinusoidal signals", Circuit Theory and Design, Aug. 27, 2007, pp. 416-419.
Spanias, "Speech Coding: A Tutotial Review", Proceedings of the IEEE, vol. 82, No. 10, Oct. 1, 1994, pp. 1539-1582.
Kroon et al., "30 On Improving the Performance of Pitch Predictors in Speech Coding Systems", Advances in Speech Coding, vol. 1, Jan. 1, 1991, pp. 321-327.
Chankawee et al., "Performance Improvement of Acoustic Feedback Cancellation in Hearing Aids Using Linear prediction", Tecon 2004, pp. 116-119.

*Primary Examiner* — Duc Nguyen
*Assistant Examiner* — Kile Blair
(74) *Attorney, Agent, or Firm* — Birch, Stewart, Kolasch & Birch, LLP

(57) ABSTRACT

A method of estimating acoustic feedback in a hearing instrument in order to reduce the impact of tonal components of acoustic feedback. The hearing instrument comprises an input transducer, an output transducer, a forward path being defined between the input transducer and the output transducer, a signal processing unit defining an input side and an output side of the forward path, and a feedback loop from the output side to the input side. The feedback loop comprises a feedback path estimation unit receiving first and second estimation input signals from the input and output side of the forward path, respectively, wherein the first and second estimation input signal paths comprise first and second long term prediction filters P(z), the feedback cancellation system being adapted to provide that the variable parameters of at least one of the long term prediction filters are estimated based on the filter input signal.

16 Claims, 1 Drawing Sheet

ADAPTIVE LONG-TERM PREDICTION FILTER FOR ADAPTIVE WHITENING

TECHNICAL FIELD

The present invention relates to feedback reduction or cancellation in listening devices. The invention relates specifically to a hearing instrument for processing an input sound to an output sound according to a user's needs.

The invention furthermore relates to a method of estimating acoustic feedback in a hearing instrument.

The invention furthermore relates to a software program for running on a signal processor of a hearing instrument and to a medium having instructions stored thereon.

The invention may e.g. be useful in applications such as hearing instruments or headsets.

BACKGROUND ART

In general, adaptive feedback cancellation schemes do not work well for tonal input signals.

In feedback cancellation systems in hearing aids, it is desirable that the output signal (i.e. receiver signal) u(n) is uncorrelated with the target input signal x(n), see FIG. 1. In this case, the algorithm used for updating the parameters of the feedback cancellation filter is typically operating under the theoretical conditions for which it is derived, and the performance of the feedback cancellation system can be good. However, unfortunately in hearing aid applications the output and input signals are typically not uncorrelated, since the output signal is in fact a delayed (and processed) version of the input signal; consequently, autocorrelation in the input signal leads to correlation between the output signal and the input signal. If correlation exists between these two signals, the adaptive algorithm (e.g., NLMS, RLS, see FIG. 1) will deliver a biased estimate of acoustic feedback. As a consequence, the feedback cancellation filter may not reduce the effect of feedback, but may in fact remove components of the target input signal, leading to signal distortions, potential loss in intelligibility (in the case that the input signal is speech) and sound quality (in the case of audio input signals), and resulting in a potentially unstable system leading to a howl.

The correlation problem mainly occurs for input signals x(n) containing signal components which are localized in the frequency domain, i.e., tone-like signal components. One way to reduce the impact of the tonal components on the estimate of the feedback cancellation filter is to filter them out of the signals e(n) and u(n) before the signals are presented to the adaptive algorithm. Such filtering is e.g. discussed in U.S. Pat. No. 6,831,986 B2, where an approach for removing the tonal components of e(n) and u(n) using a cascade of independent notch filters, each allowing removal of a single tonal component is proposed.

DISCLOSURE OF INVENTION

An object of the present invention is to reduce the impact of tonal components in the target input signal on the quality of the estimate of acoustic feedback.

Objects of the invention are achieved by the invention described in the accompanying claims and as described in the following.

An object of the invention is achieved by a hearing instrument for processing an input sound to an output sound according to a user's needs. The hearing instrument comprises an input transducer for converting an input sound to an electric input signal and an output transducer for converting a processed electric output signal to an output sound, a forward path being defined between the input transducer and the output transducer and comprising a signal processing unit defining an input side and an output side of the forward path, a feedback loop from the output side to the input side comprising a feedback cancellation system for estimating the effect of acoustic feedback from the output transducer to the input transducer, the feedback cancellation system comprising a feedback path estimation unit receiving first and second estimation input signals from the input and output side of the forward path, respectively, wherein the first and second estimation input signal paths comprise first and second long term prediction filters P(z) each having an input and an output, the feedback cancellation system being adapted to provide that the variable parameters of at least one of the long term prediction filters are estimated based on the input signal to the filter in question.

Embodiments of the invention have the advantage of leading to better feedback cancellation, even for tonal input signals.

In a particular embodiment, the feedback path estimation unit comprises an adaptive feedback cancellation (FBC) filter comprising a variable filter part for providing a specific transfer function and an update algorithm part for updating the transfer function of the variable filter part, the update algorithm part receiving said first and second estimation input signals from the input and output side of the forward path, respectively.

In a particular embodiment, the hearing instrument is adapted to provide that the variable parameters of the first filter are estimated and copied to the second filter. In a particular embodiment, the hearing instrument is adapted to provide that the variable parameters of the second filter are estimated and copied to the first filter.

In a particular embodiment, the hearing instrument is adapted to provide that the long term prediction filter P(z) is a filter according to the following z-transform $$P(z) = 1 - \sum_{k=-1}^{l} \beta_k z^{-T_0+k}$$

wherein l is an integer, and $\beta_k$ and $T_0$ are parameters determined from the input signal. Such filter is relatively simple to implement (e.g. in software, when signals are digitized and represented in a time frequency framework).

The integer l can in general be any number, e.g. a relatively large number, such as 10 or larger. In a particular embodiment, however, the hearing instrument is adapted to provide that l is smaller than 5, such as equal to 2 or 1. Thereby filters that are relatively simple to implement are provided.

In a particular embodiment, the hearing instrument is adapted to provide that the long term prediction filter P(z) is a filter according to the following $$P(z)=1-\beta z^{-T_0}$$

wherein β and $T_0$ are parameters determined from the input signal. This has the advantage that the filter is parameterized by only two parameters β, $T_0$. Additionally, the filter is well suited for modeling (voiced regions of) speech signals because it implements notches harmonically spaced with a distance of $f_s/T_0$ Hz where $f_s$ is the sampling frequency used (in Hz). This is well suited for filtering out harmonics of a speech signal or a signal comprising music.

In a particular embodiment, the sampling frequency $f_s$ and/or the parameter $T_0$ of the long term prediction filter P(z)

is/are adapted to implement notches harmonically spaced with a predefined distance of $f_s/T_0$ Hz, where $f_s$ is the sampling frequency used (in Hz). Preferably, however, the distance between the notches is dynamically adjusted.

In a particular embodiment, the hearing instrument is adapted to dynamically adjust the notches to the current tonal contents of the input signal. In practice, this can be done by adjusting the filter coefficients dynamically, and as a consequence, the notches will more or less follow the signal content.

In a particular embodiment, the hearing instrument is adapted to provide that optimal filter parameters are estimated from the digitized input signal to the (first) long term prediction filter, e.g. the error signal e(n) representing an estimate of the target signal x(n) from the input side of the forward path (cf. FIG. 2) based on an estimate of the autocorrelation function of the input signal, here of the error signal e(n), $r_{ee}(k)=E[e(n)e(n-k)]$, where E denotes the statistical expectation operator. The autocorrelation of a digital signal is e.g. discussed in S. Haykin, "Adaptive Filter Theory", Prentice-Hall International, Inc., 1996. Alternatively, the hearing instrument is adapted to provide that optimal filter parameters are estimated from the digitized input signal to the filter P(z) from the output side of the forward path (i.e. u(n) in FIG. 2) based on an estimate of the autocorrelation function $r_{uu}(k)=Eu(n)u(n-k)$ of the input signal u(n) to the (second) filter P(z) on the output side of the forward path.

In a particular embodiment, the hearing instrument is adapted to provide that the long term prediction filter P(z) is combined with a spectral shaping filter S(z) to provide a combined filter $\tilde{P}(z)=S(z)\cdot P(z)$. In a particular embodiment, the spectral shaping filter S(z) is implemented as an adaptive whitening filter, e.g. of the form $$S(z) = A(z) = 1 - \sum_{i=0}^{P-1} \alpha_i z^{-i}.,$$

where P is the filter order, and $\alpha_i$ denote the filter coefficients.

Alternatively, the spectral shaping filter could be of the form $S(z)=\tilde{A}(z)=L(z)A(z)$, where L(z) is a spectral emphasis filter, e.g. based on a priori knowledge of frequency regions most likely to exhibit howls (this information may e.g. be acquired during the fitting session at the dispenser).

Another meaningful alternative is a so-called perceptual shaping filter of the form $$S(z) = \tilde{A}(z) = \frac{A(z)}{A(z/\gamma)},$$

where the parameter $\gamma$ is typically chosen as $\gamma \approx 0.70-0.99$, see e.g. A. S. Spanias, "Speech Coding: A Tutorial Review," Proc. IEEE, October 1994, pp. 1541-1582. Any of these shaping filters have the advantage of combining the effects of spectral shaping (e.g. whitening) with the removal of tonal inputs in the signal used for estimating the feedback path.

In a further aspect, a method of estimating acoustic feedback in a hearing instrument is furthermore provided by the present invention. The hearing instrument comprises an input transducer for converting an input sound to an electric input signal and an output transducer for converting a processed electric output signal to an output sound, a forward path being defined between the input transducer and the output transducer and comprising a signal processing unit defining an input side and an output side of the forward path, a feedback loop from the output side to the input side comprising a feedback cancellation system for estimating the effect of acoustic feedback from the output transducer to the input transducer, the feedback cancellation system comprising a feedback path estimation unit receiving first and second estimation input signals from the input and output side of the forward path, respectively, the method comprising a) providing that the first and second estimation input signal paths comprise first and second long term prediction filters P(z);

b) estimating the variable parameters of at least one of the filters based on the input signal to the filter in question, and b) using the output signals of the first and second long term prediction filters, respectively, as estimation inputs to the feedback path estimation unit.

It is intended that the structural features of the hearing instrument described above, in the detailed description of 'mode(s) for carrying out the invention' and in the claims can be combined with the method, when appropriately substituted by a corresponding process. Embodiments of the method have the same advantages as the corresponding systems.

At least some of the features of the hearing instrument and method described above may be implemented in software and carried out fully or partially on a signal processing unit of a hearing instrument caused by the execution of signal processor-executable instructions. The instructions may be program code means loaded in a memory, such as a RAM, or ROM located in a hearing instrument or another device via a (possibly wireless) network or link. Alternatively, the described features may be implemented by hardware instead of software or by hardware in combination with software.

In a further aspect, a software program for running on a signal processor of a hearing instrument is moreover provided by the present invention. When the software program implementing at least some of the steps of the method described above, in the detailed description of 'mode(s) for carrying out the invention' and in the claims, is executed on the signal processor, a solution specifically suited for a digital hearing aid is provided.

In a further aspect, a medium having instructions stored thereon is moreover provided by the present invention. The instructions, when executed, cause a signal processor of a hearing instrument as described above, in the detailed description of 'mode(s) for carrying out the invention' and in the claims to perform at least some of the steps of the method described above, in the detailed description of 'mode(s) for carrying out the invention' and in the claims.

Further objects of the invention are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements maybe present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The invention will be explained more fully below in connection with a preferred embodiment and with reference to the drawings in which.

The figures are schematic and simplified for clarity, and they just show details which are essential to the understanding of the invention, while other Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

MODE(S) FOR CARRYING OUT THE INVENTION

Figure 1:
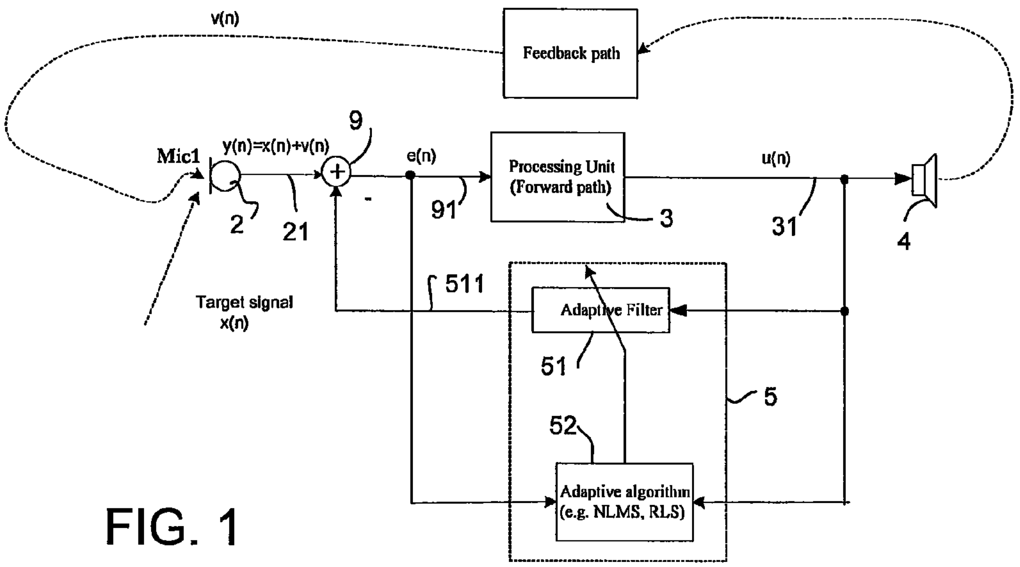
FIG. 1 shows a block diagram of a hearing instrument comprising an electric forward path, an acoustic feedback path and an electric feedback estimation path.

FIG. 1 shows a block diagram of a hearing instrument comprising an electric forward path, an acoustic feedback path and an electric feedback estimation path.

FIG. 1 shows a listening device 1 (here a hearing instrument) comprising a microphone 2 (Mic 1 in FIG. 1) for converting an input sound to a an electric (digitized) input signal 21, a receiver 4 for converting an (electric) processed output signal 31 to an output sound, a forward path comprising a signal processing unit 3 (Processing Unit (Forward path) block) being defined there between. The digital input signal 21 is denoted y(n)=x(n)+v(n) in FIG. 1, where n is a discrete-time sample index, x(n) is representative of the desired (or target) signal and v(n) is representative of the (un-intentional) feedback signal. The processed output signal 31 is denoted u(n) in FIG. 1, again indicating a digital sample representation of the output ('reference') signal. The signal processing unit 3 is adapted to provide a frequency dependent gain customized to a user's particular needs, the (feedback corrected) input signal 91 e(n) to the signal processing unit being adapted to process the input signal in the frequency domain, e.g. in a time-frequency map scheme. In a particular embodiment, the forward path comprises an AD and TF conversion unit for converting the electrical input signal to a digital time-frequency input signal comprising $TF_n$-frames representing the spectrum of the input signal in a predefined time step $t_n$, each $TF_n$-frame comprising $TF_{n,m}$-tiles of digitized values of the input signal, magnitude and phase, each $TF_{n,m}$-tile corresponding to a specific time step related to the AD-conversion (a time frame, e.g. corresponding to a predetermined number of consecutive samples of the digitized input signal, e.g. 20 samples or 100 or more) and a specific frequency step of the time to frequency conversion, thereby creating a time frequency map of the input signal to the unit. Typically, the time-to-frequency mapping that generates the TF-tiles from the time domain signal is implemented by Fourier transforming successive (and generally overlapping, cf. windowing techniques) time frames of the input signal, e.g. using Fast Fourier Transform (FFT) techniques, or by filtering the input signal in a bank of filters. The advantages of operating in the time-frequency domain are twofold. First, characteristics of auditory perception, in particular simultaneous masking effects are easiest exploited in this domain. Secondly, characteristics of typical input signals are such that the proposed noise substitution is generally (but not always) less perceptible at higher frequencies. The hearing instrument 10 further comprises a feedback loop comprising a feedback path estimation unit 5 for estimating the acoustic feedback (Feedback path in FIG. 1) from receiver 4 to microphone 2. The feedback path estimation unit 5, e.g. a variable filter, is here shown in the form of an adaptive filter 51 (Adaptive Filter block), whose filter characteristics can be customized by any adaptive filter algorithm 52 (Adaptive algorithm (e.g. NLMS, RLS) block). The processed output signal 31 of the processing unit 3 is used as input to the receiver 4 and as 'reference signal' to the feedback path estimation unit (filter part 51 as well as algorithm part 52). The output 511 of the filter part 51 of the feedback path estimation 5 is added to the electric input signal 21 from the microphone 2 in adding unit 9 to provide a feedback corrected input signal 91. This resulting 'error' signal e(n) is used as input to the signal processing unit 3 and to the algorithm part 52 of the feedback path estimation unit 5.

Figure 2:
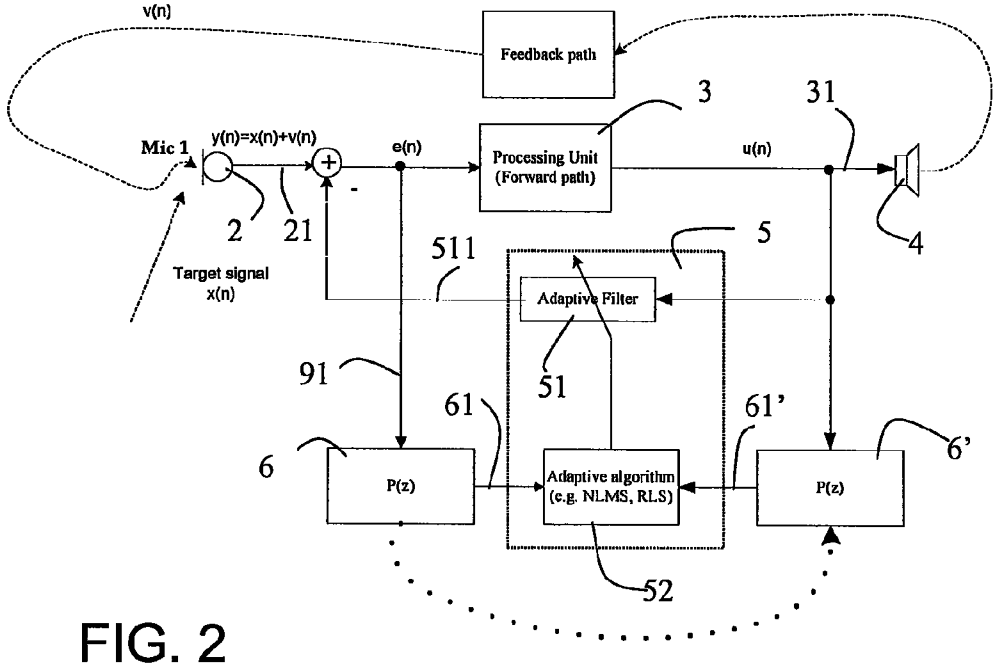
FIG. 2 shows a block diagram of an embodiment of a hearing instrument according to the invention.

We propose a modification of the electric feedback path as illustrated in FIG. 2. FIG. 2 shows a block diagram of an embodiment of a hearing instrument according to the invention. The embodiment in FIG. 2 is a slight modification of the hearing instrument shown in FIG. 1 and described above. The input paths to the algorithm part 52 of the feedback path estimation unit, here variable filter 5 each comprise a long-term prediction (LTP) filter 6, 6' (P(z) in FIG. 2) whose outputs 61 and 61', respectively constitute modified inputs to the algorithm part 52 of the variable filter 5. In the embodiment of FIG. 2, the filter coefficients of the LTP-filter 6 on the input side, which are estimated based on the e(n) signal 91, are copied to the LTP-filter 6' on the output side, which has the signal 31 u(n) as an input (as indicated by the dotted arrow from the LTP filter 6 on the input side to the LTP filter 6' on the output side of the forward path of the hearing instrument).

The goal of the embodiment of FIG. 2 is still to remove the tonal components which might be contained in the signals e(n) and u(n). In a preferred embodiment, we propose to parameterize the filter as $$P(z)=1-\beta z^{-T_0}$$

This filter is known in the field of speech coding as a long-term prediction filter and implements notches, harmonically spaced with a distance of $f_s/T_0$ Hz, where $f_s$ is the sampling frequency used (cf. e.g. A. S. Spanias, "Speech Coding: A Tutorial Review," Proc. IEEE, October 1994, pp. 1541-1582). The advantage of using this filter over e.g., a cascade of independent notch filters as proposed in U.S. Pat. No. 6,831,986 B2 is two-fold. First, it is parameterized simply by the two parameters $\beta$, $T_0$ whereas other filter realizations require more parameters. Secondly, the filter exploits the a priori knowledge that many acoustical signals exhibit a harmonic pattern; for example, it is well-known that (voiced regions of) speech signals can be modeled well as harmonically related tonal components. The model parameters $\beta$, $T_0$ must be estimated from the available signal. In FIG. 2, it is indicated that they are estimated based on the e(n) signal and then copied to the P(z) filter realization in the u(n) branch, but they could easily well be estimated based on the u(n) signal and then copied to the e(n) branch (or estimated in both). Optimal filter parameters may be estimated from e(n) as $$T_0^* = \max_{T_0}(r_{ee}^2(T_0))$$

and $$\beta^* = \frac{r_{ee}(T_0^*)}{r_{ee}(0)}$$

where $r_{ee}(k)=E[e(n)e(n-k)]$ is the autocorrelation sequence of e(n). Similar equations hold when the parameters are estimated based on u(n). Both batch and recursive estimation procedures are possible to find the expected values involved.

There is a number of straightforward and simple generalizations of the proposed method. First, instead of using a single-tap long-term prediction filter as described above, it is straightforward to generalize the filter to $$P(z) = 1 - \sum_{k=-1}^{l} \beta_k z^{-T_0+k}$$

where l is a small integer, e.g., l=1. The equations for estimating the parameters in this case are similar in style to the ones above (estimation of these parameters is well-documented in the field of speech coding, cf. e.g. A. S. Spanias, "Speech Coding: A Tutorial Review," Proc. IEEE, October 1994, pp. 1541-1582).

Often, feedback cancellation systems have been proposed, where adaptive whitening filters of the form $$A(z) = 1 - \sum_{p=1}^{P} \alpha_p z^{-p},$$

where P is the filter order and $\alpha_p$ denote filter coefficients, and where the A(z) filters are located in the block diagram in exactly the same place as P(z) above. These filters generally have a different purpose than P(z) proposed here. However, it is likely to be useful to combine the two filters, i.e., one would then operate with an adaptive filter in each of the u(n) and e(n) branches of the form $$\tilde{P}(z)=A(z)P(z)$$

Any of the (potentially combined) filters discussed can be represented by an overall z-transform of the form $$\tilde{P}(z) = \frac{\sum_{i=0}^{K} a_i z^{-i}}{1 - \sum_{i=1}^{L} b_i z^{-1}},$$

where $a_i$,$b_i$,K and L are suitably chosen constants, and where $\tilde{P}(z)$ is located schematically as shown in FIG. 2. Let $e_w(n)$ denote the output of the combined filter $\tilde{P}(z)$. In this case, $e_w(n)$ can be found from the input e(n) and previous output values as $$e_w(n)=e(n)a_0+ \ldots +e(n-K)a_K+e_w(n-1)b_1+ \ldots e_w(n-L)b_L.$$

Another implementational issue concerns the max-operator needed to find $T^*_0$ and $\beta^*$. The practical implementation may differ from this formula, using recursive update of the parameters.

The filters described above can be implemented in software or hardware, or in a combination of hardware and software adapted to the practical application and available components and restrictions.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims. For example, the illustrated embodiments are shown to contain a single microphone. Other embodiments may contain a microphone system comprising two or more microphones, and possibly including means for extracting directional information from the signals picked up by the two or more microphones.

REFERENCES

U.S. Pat. No. 6,831,986 B2 (GN RESOUND) Mar. 20, 2003.

S. Haykin, "Adaptive Filter Theory", Prentice-Hall International, Inc., 1996

S. Spanias, Speech Coding: A Tutorial Review, Proc. IEEE, October 1994, pp. 1541-1582

The invention claimed is:

1. A hearing instrument for processing an input sound to an output sound according to a user's needs, the hearing instrument comprising:

an input transducer for converting an input sound to an electric input signal;

an output transducer for converting a processed electric output signal to an output sound; and a forward path defined between the input transducer and the output transducer, the forward path including a signal processing unit defining an input side and an output side of the forward path, a feedback loop from the output side to the input side, the feedback loop including a feedback cancellation system for estimating the effect of acoustic feedback from the output transducer to the input transducer, the feedback cancellation system including a feedback path estimation unit receiving first and second estimation input signals from the input side and the output side of the forward path, respectively, wherein the first and second estimation input signal paths comprise first and second long term prediction filters P(z) each having an input and an output, the feedback cancellation system is configured to provide that the variable parameters of at least one of the long term prediction filters are estimated based on the input signal to the long term prediction filter in question, and the long term prediction filter P(z) is defined by equation $$P(z) = 1 - \sum_{k=-1}^{l} \beta_k z^{-T_0+k}$$

wherein l is an integer, and $\beta_k$ and $T_0$ are parameters determined from the input signal.

2. A hearing instrument according to claim 1 wherein the feedback path estimation unit comprises an adaptive FBC filter comprising a variable filter part for providing a specific transfer function and an update algorithm part for updating the transfer function of the variable filter part, the update algorithm part receiving said first and second estimation input signals from the input and output side of the forward path, respectively.

3. A hearing instrument according to claim 1 adapted to provide that the variable parameters of the first filter are estimated and copied to the second filter.

4. A hearing instrument according to claim 1, wherein l is smaller than 5.

5. A hearing instrument according to claim 1 adapted to provide that the long term prediction filter P(z) is a filter according to the following $$P(z)=1-\beta z^{-T_0}$$

wherein β and $T_0$ are parameters determined from the input signal.

6. A hearing instrument according to claim 5 wherein the sampling frequency $f_s$ and/or the parameter $T_0$ of the long term prediction filter P(z) is/are adapted to implement notches harmonically spaced with a predefined distance of $f_s/T_0$ Hz, where $f_s$ is the sampling frequency used (in Hz).

7. A hearing instrument according to claim 6 adapted to dynamically adjust the notches to the current tonal contents of the input signal.

8. A hearing instrument according to claim 5 adapted to provide that optimal filter parameters are estimated from the digitized input signal e(n) to the first long term prediction filter based on the autocorrelation function $r_{ee}(k)=E[e(n)e(n-k)]$ of the input signal e(n) or on the autocorrelation function $r_{uu}(k)=E[u(n)u(n-k)]$ of the input signal u(n) to the second long term prediction filter, where E denotes the statistical expectation operator.

9. A hearing instrument according to claim 1 adapted to provide that the long term prediction filter P(z) is combined with a spectral shaping filter S(z) to provide a combined filter S(z)·P(z).

10. A hearing instrument according to claim 9 adapted to provide that the spectral shaping filter S(z) is an adaptive whitening filter A(z).

11. A hearing instrument according to claim 10 adapted to provide that the spectral shaping filter is of the form $S(z)=\tilde{A}(z)=L(z)A(z)$, where L(z) is a spectral emphasis filter, e.g. based on a priori knowledge of frequency regions most likely to exhibit howls.

12. A hearing instrument according to claim 10 adapted to provide that the spectral shaping filter is a perceptual shaping filter of the form $$S(z)=\tilde{A}(z)=\frac{A(z)}{A(z/\gamma)}.$$

13. A hearing instrument according to claim 12 adapted to provide that the parameter γ is in the range from 0.70 to 0.99.

14. A method of estimating acoustic feedback in a hearing instrument, the hearing instrument comprising an input transducer for converting an input sound to an electric input signal and an output transducer for converting a processed electric output signal to an output sound, a forward path being defined between the input transducer and the output transducer and comprising a signal processing unit defining an input side and an output side of the forward path, a feedback loop from the output side to the input side comprising a feedback cancellation system for estimating the effect of acoustic feedback from the output transducer to the input transducer, the feedback cancellation system comprising a feedback path estimation unit receiving first and second estimation input signals from the input and output side of the forward path, respectively, the method comprising:

a) providing that the first and second estimation input signal paths comprise first and second long term prediction filters P(z);

b) estimating the variable parameters of at least one of the filters based on the input signal to the filter in question; and b) using the output signals of the first and second long term prediction filters, respectively, as estimation inputs to the feedback path estimation unit, wherein the long term prediction filter P(z) is defined by equation $$P(z)=1-\sum_{k=-1}^{l}\beta_k z^{-T_0+k}$$

wherein l is an integer, and $\beta_k$ and $T_0$ are parameters determined from the input signal.

15. A non-transitory computer-readable medium storing a software program for running on a signal processor of a hearing instrument, wherein the software program implements the steps of the method according to claim 14 when executed on the signal processor.

16. A non-transitory computer-readable medium having instructions stored thereon, that when executed, cause a signal processor of a hearing instrument to perform a method comprising:

a) providing that the first and second estimation input signal paths comprise first and second long term prediction filters P(z);

b) estimating the variable parameters of at least one of the filters based on the input signal to the filter in question; and b) using the output signals of the first and second long term prediction filters, respectively, as estimation inputs to the feedback path estimation unit, wherein the long term prediction filter P(z) is defined by equation $$P(z)=1-\sum_{k=-1}^{l}\beta_k z^{-T_0+k}$$

wherein l is an integer, and $\beta_k$ and $T_0$ are parameters determined from the input signal.

* * * * *